(12) United States Patent
Min et al.

(10) Patent No.: US 10,698,241 B2
(45) Date of Patent: Jun. 30, 2020

(54) SILICON COMPOUND AND HARD COATING FILM AND DISPLAY DEVICE INCLUDING THE SAME

(71) Applicant: LG DISPLAY CO., LTD., Seoul (KR)

(72) Inventors: Hye-Li Min, Goyang-si (KR); Jae-Hyun Park, Seoul (KR); Chang-Woo Chun, Cheonan-si (KR)

(73) Assignee: LG DISPLAY CO., LTD., Seoul (KR)

( * ) Notice: Subject to any disclaimer, the term of this patent is extended or adjusted under 35 U.S.C. 154(b) by 291 days.

(21) Appl. No.: 15/823,034

(22) Filed: Nov. 27, 2017

(65) Prior Publication Data

US 2018/0149905 A1    May 31, 2018

(30) Foreign Application Priority Data

Nov. 28, 2016 (KR) ........................ 10-2016-0159330

(51) Int. Cl.
  *G02F 1/1333*    (2006.01)
  *C07F 7/21*      (2006.01)
  (Continued)

(52) U.S. Cl.
  CPC ........ *G02F 1/133308* (2013.01); *C07F 7/087* (2013.01); *C07F 7/21* (2013.01);
  (Continued)

(58) Field of Classification Search
  CPC ......... G02F 1/133308; G02F 1/134363; G02F 1/133615; G02F 1/133606; G02F 2001/133331; G02F 2001/133317; G02F 2001/133607; G02F 2201/501; G02F 2201/124; G02F 2201/50; G02B 1/14; G02B 1/04; G02B 6/00; G02B 6/0053; G02B 5/04; C07F 7/087; C07F 7/21; C07F 11/00; B32B 2457/20; B32B 2457/202; B32B 2457/206; Y10T 428/1045; B29D 11/0073; C09D 4/06; C08G 77/485
  See application file for complete search history.

(56) References Cited

U.S. PATENT DOCUMENTS

2016/0282652 A1    9/2016    Kuk et al.

FOREIGN PATENT DOCUMENTS

CN    101770045 A    7/2010
CN    102176080 A    9/2011
(Continued)

OTHER PUBLICATIONS

Sorokin et al., Selenium- and Tellurium-containing Silatrane Derivatives Having an ECH2Si Fragment, 2006, Russian Journal of General Chemistry, vol. 76, No. 3, pp. 461-468.*
(Continued)

*Primary Examiner* — Eli D. Strah
(74) *Attorney, Agent, or Firm* — Birch, Stewart, Kolasch & Birch, LLP

(57) ABSTRACT

A liquid crystal display device includes a liquid crystal panel; and a backlight unit disposed at one side of the liquid crystal panel. The backlight unit includes a prism sheet, which comprises a base and a plurality of prism patterns arranged on the base and a binder and a silicon compound having adjacent siloxane moieties linked via a diselenide group, and a light source disposed at a lower portion of the prism sheet. In the liquid crystal display device, the prism sheet is disposed between the light source and the liquid crystal panel.

10 Claims, 6 Drawing Sheets

(51) Int. Cl.
  *C07F 11/00* (2006.01)
  *G02B 1/14* (2015.01)
  *G02B 6/00* (2006.01)
  *C07F 7/08* (2006.01)
  *B29D 11/00* (2006.01)
  *G02F 1/13357* (2006.01)
  *G02F 1/1343* (2006.01)

(52) U.S. Cl.
  CPC ............. *C07F 11/00* (2013.01); *G02B 1/14* (2015.01); *G02B 6/00* (2013.01); *B29D 11/0073* (2013.01); *B32B 2457/20* (2013.01); *B32B 2457/202* (2013.01); *B32B 2457/206* (2013.01); *G02F 1/133615* (2013.01); *G02F 1/134363* (2013.01); *G02F 2001/133317* (2013.01); *G02F 2001/133331* (2013.01); *G02F 2201/124* (2013.01); *G02F 2201/50* (2013.01); *G02F 2201/501* (2013.01); *Y10T 428/1045* (2015.01)

(56) References Cited

FOREIGN PATENT DOCUMENTS

| | | |
|---|---|---|
| CN | 103728681 A | 4/2014 |
| CN | 104066778 A | 9/2014 |
| CN | 104732886 A | 6/2015 |
| CN | 104948998 A | 9/2015 |
| CN | 105273559 A | 1/2016 |
| KR | 10-2013-0051126 | 5/2013 |
| KR | 10-1347245 | 1/2014 |

OTHER PUBLICATIONS

Shaobo Ji et. al, "Dynamic Diselenide Bond and Its Application in Self-healing Materials", 24th branch of 30th Academic Annual Conference of Chinese Chemical Society; Supramolecular Assembly and Soft Material Jul. 1, 2016.

\* cited by examiner

SILICON COMPOUND AND HARD COATING FILM AND DISPLAY DEVICE INCLUDING THE SAME

CROSS-REFERENCE TO RELATED APPLICATIONS

This application claims the priority benefit under 35 U.S.C. § 119(a) of Korean Patent Application No. 2016-0159330, filed on Nov. 28, 2016, in the Korean Intellectual Property Office, which is incorporated herein by reference in its entirety.

BACKGROUND

1. Technical Field

The present disclosure relates to a silicon compound, and more particularly, to a silicon compound having improved physical properties such as anti-scratch characteristics, and a hard coating film and a display device including the silicon compound.

2. Discussion of the Related Art

The display field for processing and displaying a large amount of information has rapidly advanced with the rapid development of information and communication technology. Accordingly, flat-panel display devices having excellent performance, which may be thin and lightweight and driven with low power consumption, such as liquid crystal display (LCD) devices, organic light emitting diode (OLED) display devices, and the like, are replacing conventional cathode ray tubes (CRTs).

In particular, thin-film and slim base materials for display devices applied to mobile devices such as smart phones and tablet PCs have been required with the development of technology in such mobile devices. As materials having excellent mechanical characteristics, a cover glass such as glass or reinforced glass has been generally used in display windows or front surfaces of such mobile devices. However, glass has drawbacks in that an increase in weight of the mobile devices may be caused due to the weight of glass itself, and the mobile devices may be damaged by external impact. Therefore, display devices applicable to the mobile devices having a structure from which the cover glass is removed have been proposed.

However, as a touch function is added to the display devices, surface damage such as scratches may occur due to a touch action on the display devices having a cover glass-free structure. To prevent this damage, a plastic material composed of a polymer resin has been proposed as a material capable of replacing the glass. Films made of the plastic material are suitable for lighter mobile devices because the films are lightweight and are also less fragile than the glass. Particularly, films in which a resin base material is coated with a hard coating film have been proposed to realize the films having characteristics such as high hardness and wear resistance.

A hard coating film is introduced into the uppermost layer of a display device to prevent surface damage to the display device. However, resins applied to conventional hard coating films have a drawback in that the resins are damaged by external stress due to low anti-scratch characteristics. It is contemplated to form a thick hard coating film, but such a hard coating film has a problem in that the hard coating film does not fit the trend of slim, thin and lightweight mobile devices. In addition, a surface of the hard coating film may be damaged as stress constantly applied to the mobile devices is accumulated on the hard coating film.

To solve the above problems, a hard coating film to which a resin such as polyimide is added has been proposed. However, such a polyimide resin has drawbacks in that the polyimide resin has poor compatibility with an acrylate-based resin used as a main ingredient of the hard coating film, and light transmissivity may be degraded.

In this way, when a thickness of the hard coating film is reduced to obtain a thin and slim base material for display devices, the anti-scratch characteristics and/or strength of the hard coating film are not maintained to a sufficient extent, which makes it difficult to secure appropriate physical properties of the hard coating film. Accordingly, there is a need for development of hard coating films having improved physical properties such as strength and hardness even when the hard coating films have a small thickness.

SUMMARY

It is an object of the present disclosure to provide a silicon compound capable of utilizing self-healing characteristics to remarkably improve physical properties such as anti-scratch characteristics and hardness characteristics.

It is another object of the present disclosure to provide a hard coating film having improved anti-scratch characteristics and hardness characteristics, a prism sheet and a display device.

According to one aspect of the present disclosure having the aforementioned objects, the present disclosure provides a silicon compound having adjacent siloxane moieties linked via a diselenide group.

For example, the silicon compound may have a repeating unit represented by the following Chemical Formula 1.

$$A\text{-}(L_1)_m\text{-}Se\text{---}Se\text{-}(L_2)_n\text{-}B \qquad \text{Chemical Formula 1}$$

wherein A and B each independently represent a siloxane moiety, $L_1$ and $L_2$ each independently represent a C1-C10 alkylene group, a C3-C20 cycloalkylene group, or a C5-C30 arylene group, and m and n are each independently 0 or 1.

In this case, each of the adjacent siloxane moieties linked via the diselenide group, for example, each of A and B in Chemical Formula 1 may be a silsesquioxane moiety.

According to another aspect of the present disclosure, the present disclosure provides a hard coating film which includes a binder and the aforementioned silicon compound dispersed in the binder, or a prism sheet which includes a binder and the aforementioned silicon compound dispersed in the binder, and is composed of a plurality of prism patterns.

According to still another aspect of the present disclosure, the present disclosure provides a display device including the aforementioned hard coating film and/or prism sheet.

Advantages and features of the disclosure will be set forth in part in the description, which follows and in part will become apparent to those having ordinary skill in the art upon examination of the following or may be learned from practice of the disclosure. Other advantages and features of the embodiments herein may be realized and attained by the structures particularly pointed out in the written description and claims as well as the appended drawings.

It is to be understood that both the foregoing general description and the following detailed description are explanatory, and are intended to provide further explanation of the embodiments as claimed.

BRIEF DESCRIPTION OF THE DRAWINGS

The accompanying drawings, which are included to provide a further understanding of the disclosure, are incorporated in and constitute a part of this specification, illustrate implementations of the disclosure and together with the description serve to explain the principles of embodiments of the disclosure.

DETAILED DESCRIPTION

Figure 1:
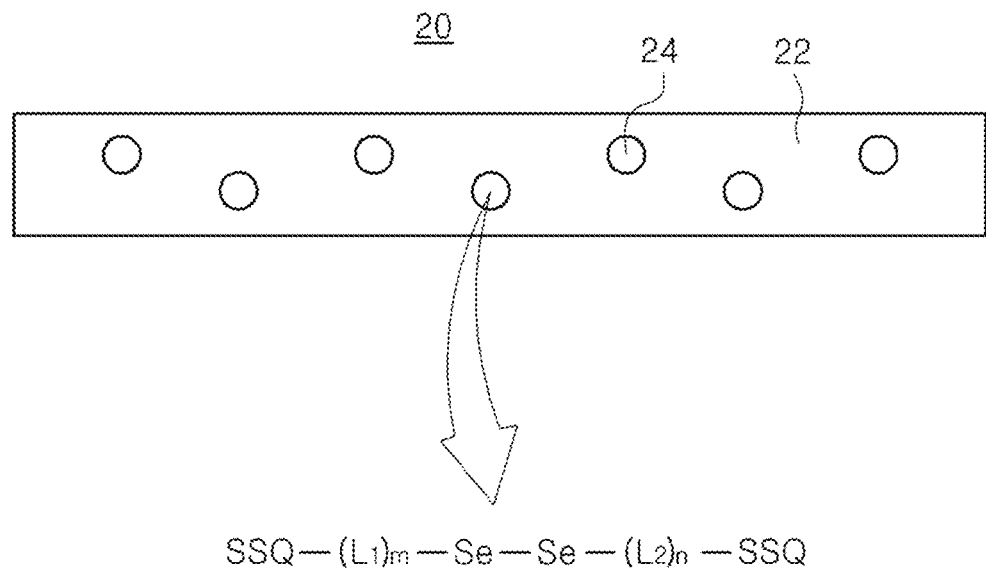
FIG. 1 is a cross-sectional view schematically showing a hard coating film to which a silicon compound according to one exemplary embodiment of the present disclosure is applied.

Reference will now be made in detail to embodiments of the present disclosure, examples of which are illustrated in the accompanying drawings. In the following description, when a detailed description of well-known functions or configurations related to this document is determined to unnecessarily obscure the gist of an embodiment of the disclosure, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following description are selected only for the sake of convenience in writing the specification and thus may be different from those used in actual products.

Hereinafter, the present disclosure will be described with reference to the accompanying drawings, when necessary.

[Silicon Compound]

A silicon compound according to the present disclosure has a structure in which adjacent siloxane moieties are linked to a diselenide group (—Se—Se—). A reversible self-healing mechanism in which the diselenide group cleaved by external stress is then linked by light irradiation is induced to release the external stress.

In one exemplary embodiment, the silicon compound of the present disclosure has a structure represented by the following Chemical Formula 1.

A-(L$_1$)$_m$-Se—Se-(L$_2$)$_n$-B            Chemical Formula 1 wherein A and B each independently represent a siloxane moiety, L$_1$ and L$_2$ each independently represents a C1-C10 alkylene group, a C3-C20 cycloalkylene group, or a C5-C30 arylene group, and m and n are each independently 0 or 1.

In Chemical Formula 1, L$_1$ and L$_2$ may be preferably a C1-C10 alkylene group. When carbon atoms of an alkylene group as a linking group between selenide and siloxane moieties are greater than 10, acrylic characteristics of the linking group may be enhanced, resulting in degraded anti-scratch characteristics. Meanwhile, A and B linked to the diselenide group are siloxane moieties that are adjacent to each other. For example, the silicon compound according to the present disclosure may have a cluster structure in which a plurality of adjacent siloxane moieties are linked via a plurality of diselenide groups.

Unit structures of siloxane formed via Si—O—Si bonds may be divided into and defined as a Q type (Si(O)$_4$), a T type (Si(O)$_3$OR, or Si(O)$_3$R), and a D type (Si(O)$_2$(OR)$_2$, or Si(O)$_2$(R)$_2$), an M type (Si(O)(OR)$_3$, Si(OR)$_4$, Si(O)(R)$_3$, or Si(R)$_4$), depending on the number of oxygen atoms linked to the silicon atoms, and the number of substituents. In this case, each of A and B in Chemical Formula 1 may have M-type, T-type, D-type and Q-type siloxane unit structures, preferably a T-type siloxane unit structure.

A and B containing such a siloxane moiety may contain a linear siloxane group, a cyclosiloxane group, or a siloxane group having a tetrahedral structure, or may be any one selected from silsesquioxane-based groups. According to one exemplary embodiment, A and B may contain a siloxane moiety having bulky characteristics. In this case, A and B may contain a cyclosiloxane moiety having excellent hardness characteristics and/or beat-resistance characteristics, a siloxane moiety having a tetrahedral structure, or a silsesquioxane moiety as such a siloxane moiety.

For example, an alkyl-substituted cyclosiloxane as the cyclosiloxane group may include a polydialkylsiloxane in which silicon atoms are substituted with two alkyl groups, for example, a polydimethyl siloxane (PDMS)-based polycyclosiloxane. A material containing a cyclosiloxane group may be selected from the group consisting of methylhydrocyclosiloxane; hexa-methylcyclotrisiloxane; hexa-ethylcyclotrisiloxane; tetra-, penta-, hexa-, octa-methylcyclotetrasiloxanes; tetra-ethylcyclotetrasiloxane; tetra-octylcyclotetrasiloxane; tetra-, penta-, hexa-, octa- and deca-methylcyclopentasiloxanes; tetra-, penta-, hexa-, octa- and dodeca-methylcyclohexasiloxanes; tetradeca-methylcycloheptasiloxane; hexadeca-methylcyclooctasiloxane; tetraphenyl cyclotetrasiloxane; and a combination thereof.

Also, non-limiting examples of the material containing a tetrahedral siloxane group may include tetrakis dimethylsiloxy silane, tetrakis diphenylsiloxy silane, tetrakis diethylsiloxy silane, and a mixture thereof.

According to preferred embodiments, each of A and B may contain a silsesquioxane moiety as the siloxane moiety having a T-type unit structure. The silsesquioxane may be defined as a T-type siloxane represented by $(RSiO_{3/2})_n$ (where R is hydrogen, a C1-C10 alkyl or alkylene group, or a C2-C10 allyl or arylene group, and n is 6, 8, 10, 12, or 16). In this case, the silsesquioxane may be synthesized by a hydrolysis-polymerization method using a trialkoxysilane $(RSi(OR)_3)$ or a trichlorosilane $(RSiCl_3)$.

The silsesquioxane may have a ladder structure, a cage structure, and a random structure, depending on the cross-linking structure and shape thereof. In this case, the cage structures may be divided into a complete cage structure and an incomplete cage structure (a partial cage/open cage structure) in which a part of a cage is open. Particularly, the silsesquioxane having a cage structure is referred to as a polyhedral oligomeric silsesquioxane (POSS). In the complete cage structure, n is 6, 8, 10, 12, or 16, and a silanol group is disposed outside the cage structure in the case of the incomplete cage structure.

According to one exemplary embodiment, when A and B in Chemical Formula 1 represent a silsesquioxane moiety having a cage structure, the silicon compound according to the present disclosure may be represented by the following Chemical Formula 2.

ladder structure, the incomplete cage structure, and the complete cage structure. Therefore, at least one of A and B in Chemical Formula 1 may be preferably a silsesquioxane having a cage structure with high structural stability, such as a complete cage structure or an incomplete cage structure.

That is, when a structure in which two adjacent silsesquioxane moieties are linked, a diselenide group interposed therebetween is used. When a cage structure having bulky characteristics is particularly used in one of the silsesquioxane moieties linked via a diselenide group, the silsesquioxane moiety may have excellent structural stability or hardness characteristics. For example, A in Chemical Formula 1 may be a silsesquioxane moiety having a random structure or a cage structure, and B may be a silsesquioxane moiety having a cage structure.

When the siloxane moieties linked via the diselenide group are silsesquioxane moieties, improvements in structural stability and hardness may be attained. However, bonding between selenol (—SeH) groups which may form a diselenide group may be inhibited due to excessive structural stability caused by the structure closer to a crystal phase. When the selenol (—SeH) groups are introduced into a binder, compatibility may be degraded. Therefore, according to one exemplary embodiment, suitable linkers ($L_1$ and $L_2$ in Chemical Formulas I and 2) may be preferably introduced into a site linked with a diselenide group in the silsesquioxane moiety to impart structural flexibility in the silicon compound.

Chemical Formula 2

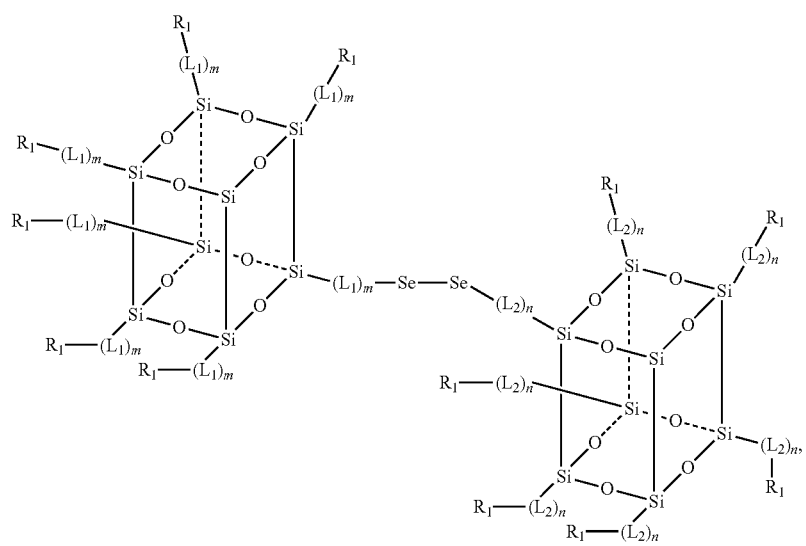

wherein $R_1$ represents a selenol group (—SeH) or a diselenide group (—Se—Se—), and $L_1$, $L_2$, m and n are as defined in Chemical Formula 1.

When each of the adjacent siloxane moieties linked via the diselenide group (i.e., A and B) contains a silsesquioxane moiety, silsesquioxanes having all structures such as a random structure, a ladder structure, an incomplete cage structure, and a complete cage structure are possible. Structural stability of the silsesquioxane moieties linked via the diselenide group increases in the order of the random structure, the ladder structure, the incomplete cage structure, and the complete cage structure. This is because a structure similar to a hexahedral structure is formed as the structural stability is realized in the order of the random structure, the As shown in Chemical Formula 2, when the diselenide group binds the bulky silsesquioxane moieties, the diselenide group may be structurally hidden by the silsesquioxane moieties. Therefore, because the diselenide group may remain even after a hard coating film 20 (see FIG. 1) is formed (e.g., using the silicon compound according to the present disclosure) the diselenide group may also be advantageous in maintaining self-healing characteristics.

In this way, the silicon compound according to the present disclosure contains a diselenide (—Se—Se—) moiety having self-healing characteristics, and siloxane (—Si—O—Si—) moieties linked to both sides of the diselenide group. That is, the adjacent siloxane moieties are linked via the diselenide group.

Therefore, as will be described below, when stress is applied to a hard coating film 20 (see FIG. 1) or a prism sheet 400 (see FIGS. 7A and 7B), which includes the silicon compound of the present disclosure, the diselenide group dissociates so that defects occur temporarily in the hard coating film or the prism sheet. However, when the diselenide group which has been dissociated by external stress is irradiated with light, the diselenide group is re-formed to correct the defects, thereby preventing damage to the hard coating film or the prism sheet. Because the re-formation of the diselenide group may be carried out due to low radiant intensity, the self-healing characteristics of the silicon compound according to the present disclosure may last semi-permanently. Also, when the silsesquioxane moiety is applied as the siloxane moiety, the silicon compound has an advantage in that sufficient hardness may be secured.

Next, a method of synthesizing the silicon compound having adjacent siloxane moieties linked via the diselenide group according to the present disclosure will be described. As will be described below, a silicon compound, which contains a silsesquioxane moiety as a siloxane moiety and has a structure in which a linker (L) is linked between a diselenide group and a silicon atom constituting a silsesquioxane, will be mainly described.

As represented by the following Reaction Formula 1, a silsesquioxane into which a selenol group is introduced is synthesized using a trialkoxysilane (where each $R_2$ in Reaction Formula 1 is hydrogen or a C1-C10 alkyl group, and L represents $L_1$ or $L_2$ defined in Chemical Formula 1), into which a selenol group is introduced, as a precursor material. Optionally, trichlorosilane into which a selenol group is introduced may be used as the precursor material instead of the trialkoxysilane into which the selenol group is introduced. Hydrochloric acid and optionally magnesium bromide are added to a mixture including the trialkoxysilane or trichlorosilane into which the selenol group is introduced, and a suitable solvent, for example, methanol, and stirred at a high temperature, for example, 70 to 110° C., preferably 80 to 100° C., for example, 90° C. to synthesize a silsesquioxane into which the selenol group is introduced. In this case, a metal halide such as magnesium bromide may be used as a catalyst to promote a reaction between a selenol and silicon atoms constituting the silsesquioxane. In this case, the silicon atoms of the silsesquioxane may preferentially bind to magnesium bromide, and a selenide of trialkoxysilane-selenol may be replaced with magnesium bromide bound to the silicon atoms of the silsesquioxane in the presence of hydrochloric acid to obtain an intermediate product in which a selenol is bound to the silicon atoms constituting the silsesquioxane, as shown in Reaction Formula 1.

Reaction Formula 1

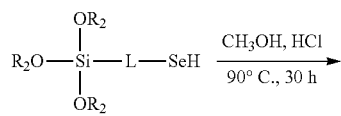

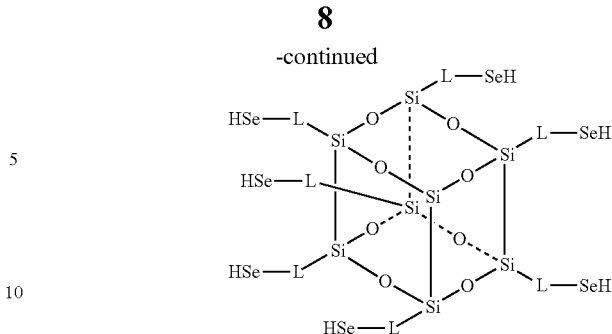

According to Reaction Formula 1, a silsesquioxane intermediate product having a random structure or a cage structure in which a selenol group is introduced to silicon atoms may be obtained. In this case, a silsesquioxane-selenol intermediate product having a combined random and cage structure may be separated through recrystallization. For example, because the cage structure has a unique crystal phase, the intermediate product obtained in Reaction Formula 1 may be separated due to a difference in solubility when the intermediate product is added to a suitable solvent, for example tetrahydrofuran (THF). Optionally, the intermediate product may be mixed with a poor solvent (e.g., acetonitrile) and freeze-stored to separate only a silsesquioxane into which the selenol group is introduced, which has a crystal-phase cage structure. The silsesquioxane-selenol intermediate product having the separated cage structure may be used to synthesize a silicon compound in which adjacent silsesquioxane moieties are linked via a diselenide group according to Reaction Formula 2 as will be described below.

Meanwhile, in addition to the trichlorosilane or the trialkoxysilane that is a precursor material used to synthesize the silsesquioxane, a coupler having a lamellar structure may be used to synthesize a silsesquioxane having a ladder structure arranged in a predetermined lengthwise direction. 1,4-Dichlorophenylenediamine or 1,2-dichloroethylenediamine may be used as the coupler. In this case, a pre-coupling reaction between the trichlorosilane and the coupler may be performed, reaction intermediates may be hydrolyzed and self-assembled to form a silanol-reaction intermediate product, and such a product may be subjected to a condensation polymerization reaction using a weak base such as triethylamine or triisobutylamine as a catalyst to synthesize a silsesquioxane having a ladder structure.

When the silsesquioxane intermediate product into which a selenol is introduced is reacted at a temperature of approximately 60 to 100° C., preferably 70 to 90° C., for example, 80° C., as shown in the following Reaction Formula 2, the silicon compound according to the present disclosure may be synthesized by linking adjacent selenol groups introduced into the silsesquioxane to form a diselenide bond. In Reaction Formula 2, a configuration in which one selenol group in a silsesquioxane moiety reacts with one selenol group of another adjacent silsesquioxane moiety to form a diselenide bond is described for the sake of convenience, but another selenol group introduced into the silsesquioxane moiety may also react with a selenol group introduced into an adjacent silsesquioxane moiety to form a diselenide bond.

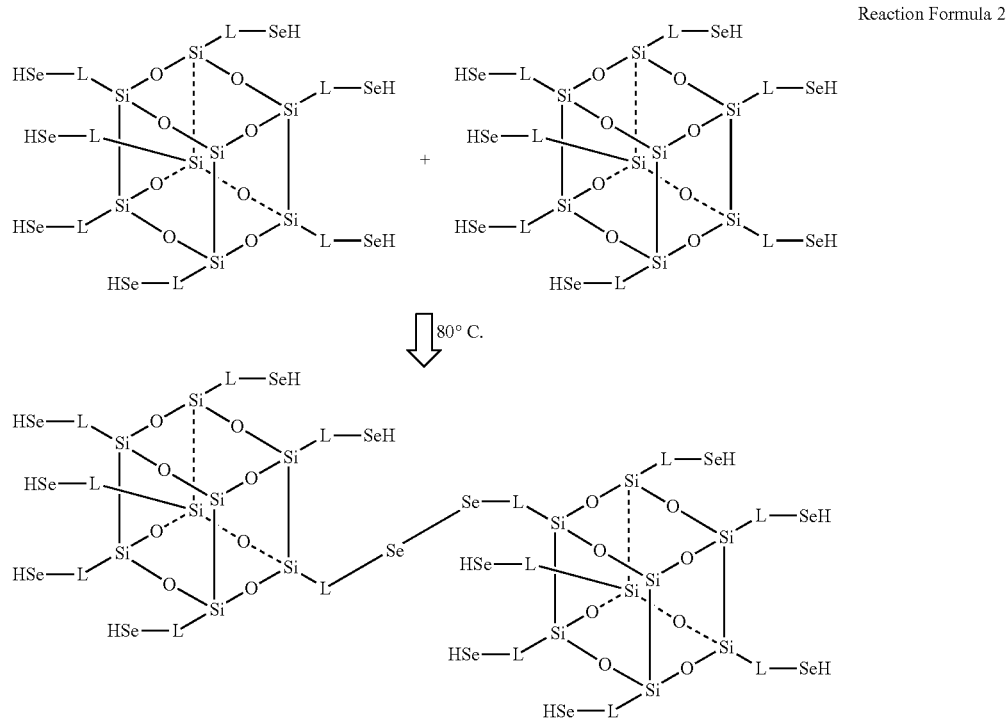

Reaction Formula 2

As described above, the silicon compound according to the present disclosure may correct defects caused by the stress through a semi-permanent self-healing mechanism. The silicon compound according to the present disclosure may be applied to parts, in which defects occur by the stress in the members constituting the display device, to improve physical properties such as anti-scratch characteristics and hardness characteristics.

[Hard Coating Film and Display Device]

According to a first embodiment for applying the silicon compound according to the present disclosure, the silicon compound of the present disclosure may be applied to a hard coating film constituting the outermost layer of a display device. FIG. 1 is a cross-sectional view schematically showing a hard coating film to which the silicon compound according to one exemplary embodiment of the present disclosure is applied. As shown in FIG. 1, the hard coating film 20 includes a binder 22 and a silicon compound 24 of the present disclosure dispersed in the binder 22.

The binder 22 may be a photoreactive (photocurable) compound, for example, a (meth)acrylate-based resin. In this specification, the term "(meth)acrylate" generally refers to both an acrylate and a methacrylate. For example, the binder 22 may include binders cured by UV rays. In this case, the binder 22 may include any one selected from polyester(meth)acrylate, epoxy(meth)acrylate, urethane (meth)acrylate, and siloxane-modified (meth)acrylate, but the present disclosure is not limited thereto.

The silicon compound 24 has a structure in which adjacent siloxane moieties, for example, silsesquioxane (SSQ) moieties, are linked via a diselenide group. According to one exemplary embodiment, the silicon compound 24 may be dispersed in the binder 22 at a ratio of 0.1 to 10 parts by weight, preferably 1 to 10 parts by weight. In this specification, the term "part(s) by weight" refers to a weight ratio(s) between individual components to be blended.

When the content of the silicon compound 24 is less than 0.1 part by weight, a self-healing mechanism hardly occurs in the hard coating film 20, which makes it difficult to expect an effect of correcting defects of the hard coating film 20 to prevent damage to the hard coating film 20. On the other hand, when the content of the silicon compound 24 is greater than 10 parts by weight, optical characteristics of the hard coating film 20 may be deteriorated.

The hard coating film 20 may be prepared from a liquid composition for forming hard coatings used to form the binder 22. The liquid composition for forming the hard coating film 20 may include a precursor such as a (meth)acrylate-based monomer and/or oligomer, a photopolymerization initiator, a solvent, and the silicon compound 24 according to the present disclosure.

A (meth)acrylate-based reactive component capable of forming the binder 22 may include a monomer and/or oligomer having an ethylenic double bond. Such a (meth)acrylate-based reactive component may be selected from the group consisting of aliphatic (meth)acrylate-based reactive components substituted with a C1-C20 alkyl group, a C2-C20 alkenyl group, a C2-C20 alkynyl group, a C1-C20 alkoxy group, a C1-C20 alkoxyalkyl group, a C1-C20 alkoxyallyl group, an epoxy group, and the like, C5-C8 cycloalkyl (meth)acrylate-based reactive components, C5-C20 aryl (meth)acrylate-based reactive components, allyl alkoxylate-based reactive components having a C1-C20 alkoxy group, and combinations thereof.

For example, the (meth)acrylate-based reactive component may include pentaerythritol triacrylate (PETA), dipentaerythritol pentaacrylate (DPPA), dipentaerythritol hexaacrylate (DPHA), or trimethylolpropane triacrylate (TMPTA), but the present disclosure is not limited thereto. For example, the (meth)acrylate-based oligomer may be included at a ratio of 30 to 70 parts by weight, preferably 40 to 60 parts by weight in the liquid composition for forming hard coatings, and the (meth)acrylate-based monomer may be included at a ratio of 5 to 20 parts by weight.

The photopolymerization initiator that may be included in the liquid composition for forming hard coatings is not particularly limited, and includes an acetophenone-based photopolymerization initiator, a benzophenone-based photopolymerization initiator, a thioxanthone-based photopolymerization initiator, a benzoin-based photopolymerization initiator, a triazine-based photopolymerization initiator. For example, a commercially available photopolymerization initiator that may be composed of Irgacure 184, Irgacure 819, and a combination thereof may be used. The photopolymerization initiator may be included at a ratio of approximately 0.1 to 10 parts by weight in the liquid composition for forming hard coatings.

The solvent included in the liquid composition for forming hard coatings is not particularly limited, and may be, for example, selected from the group consisting of propylene glycol methyl ether acetate (PGMEA), propylene glycol ethyl ether acetate (PGEEA), propylene glycol methyl ether (PGME), propylene glycol propyl ether (PGPE), ethylene glycol monomethyl ether acetate, ethylene glycol monoethyl ether acetate, ethylene glycol monobutyl ether acetate, ethylene glycol monomethyl ether, ethylene glycol monoethyl ether, diethyl glycol methyl acetate, dipropylene glycol methyl ether, methyl ethoxypropionate, ethyl ethoxypropionate, ethyl acetate, butyl acetate, cyclohexanone, acetone, methyl isobutyl ketone, dimethylformamide, N,N'-dimethylacetamide, N-methylpyrrolidone, toluene, and a combination thereof. In the liquid composition for forming hard coatings, the solvent may be blended at a ratio of 60 to 90 parts by weight.

A suitable base material may be coated with the aforementioned liquid composition for forming hard coatings (for example, through roll coating, spin coating, dip coating, flow coating, and spray coating), and cured with UV rays to prepare a hard coating film 20 in which the silicon compound 24 is dispersed in the binder 22. For UV curing, a suitable light source (for example, a UV or LED lamp) may be used. As the photoreactive component, a (meth)acrylate-based reactive component is cured accordingly. For example, the UV curing may be performed by irradiation with light with an intensity of approximately 3,000 to 5,000 $J/cm^2$, and may be performed for several seconds.

Figure 2:
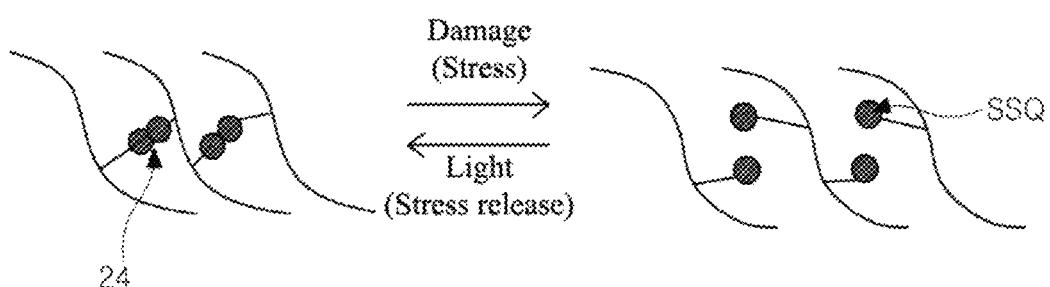
FIG. 2 is a diagram schematically showing a self-healing mechanism of the silicon compound according to one exemplary embodiment of the present disclosure.

Meanwhile, FIG. 2 is a diagram schematically showing a self-healing mechanism of the silicon compound according to one exemplary embodiment of the present disclosure. As shown in FIG. 2, a self-healing reaction may occur by absorption of visible light in the hard coating film 20 including the silicon compound 24 according to the present disclosure. Particularly, when the silsesquioxane moiety having bulky characteristics is applied as the siloxane moiety, the diselenide group constituting the silicon compound 24 is structurally buried by the silsesquioxane moiety, and the hard coating film 20 has self-healing characteristics because the diselenide moiety remains even after the hard coating film 20 is formed by a process such as UV curing, and the like.

When the diselenide group binds adjacent silsesquioxane moieties, the diselenide group is structurally buried by the silsesquioxane moieties, and an attack on the diselenide group is blocked in a UV curing process. Therefore, even when stress is applied to the hard coating film 20 to cause temporary defects, the defects may be corrected by means of a self-healing mechanism of the diselenide group to relieve the stress because the diselenide group remains in the hard coating film 20.

Specifically, as shown in FIGS. 1 and 2, when stress is applied to the hard coating film 20 (see FIG. 1), the diselenide group of the silicon compound 24 dissociates (or is separated), thereby causing temporary defect in the hard coating film 20. That is, the diselenide group having a relatively low bonding enthalpy dissociates due to external stress. When such defects are not corrected, the defects continue to grow, which leads to damage such as scratches in the hard coating film 20.

However, in the present disclosure, because the diselenide group is re-formed by visible light, growth and accumulation of the defects caused by stress accumulation may be prevented. That is, because the hard coating film 20 of the present disclosure has self-healing characteristics through a reversible reaction triggered by light, damage to the hard coating film 20 by stress such as a user's touch is prevented. Particularly, radiant intensity (i.e., a level of light energy) required to re-form the diselenide group which has dissociated from a selenol is very low. Therefore, in the hard coating film 20 including the silicon compound 24 according to the present disclosure, a self-healing mechanism through the re-formation of the diselenide group may occur quickly just by applying light with low radiant intensity, such as indoor or outdoor light, to the display device, thereby effectively preventing damage to the hard coating film 20.

Figure 3:
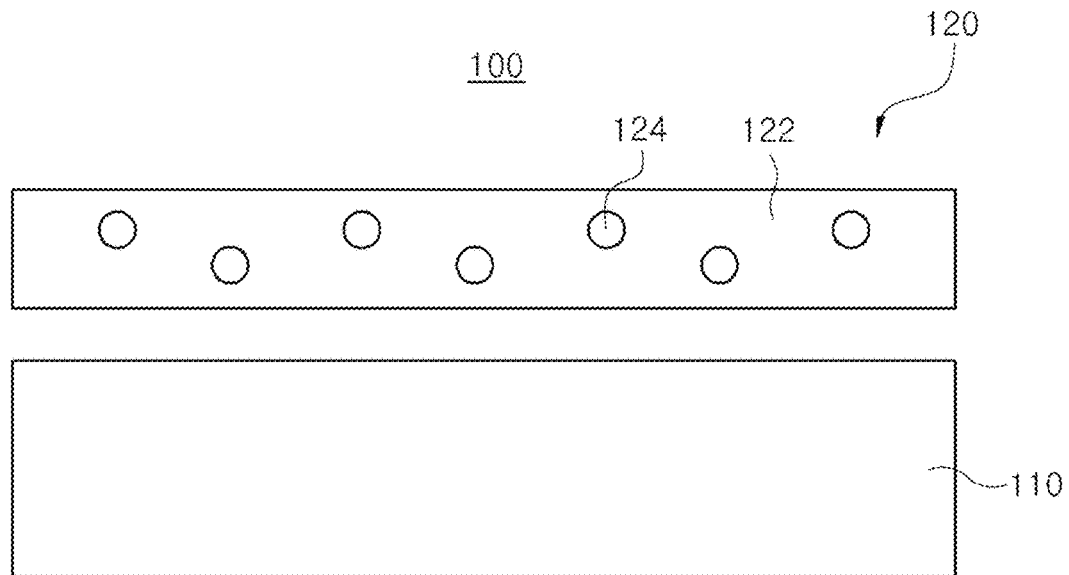
FIG. 3 is a cross-sectional view schematically showing a display device including a hard coating film to which a silicon compound according to one exemplary embodiment of the present disclosure is applied.

Subsequently, the display device to which the hard coating film according to the present disclosure is applied will be described. FIG. 3 is a cross-sectional view schematically showing a display device including a hard coating film to which a silicon compound according to one exemplary embodiment of the present disclosure is applied. As shown in FIG. 3, a display device 100 according to one exemplary embodiment of the present disclosure includes a display panel 110 and a hard coating film 120 disposed at one side of the display panel 110.

The hard coating film 120 faces a display surface of the display panel 110, and forms the outermost layer of the display device 100. The hard coating film 120 includes a binder 122, and a silicon compound 124 dispersed in the binder 122 and containing a diselenide group (—Se—Se—) for self-healing characteristics and siloxane moieties (—Si—O—Si—) linked to sides of the diselenide group. That is, the adjacent siloxane moieties in the silicon compound 124 are linked via the diselenide group.

As described above, when stress is applied to the hard coating film 120 during an operation of the display device 100, the diselenide group dissociates so that temporary defects occur in the hard coating film 120. Then, when such defects grow and are retained, surface damage to the hard coating film 120 is caused. However, in the present disclosure, when the diselenide group which has been dissociated by stress is irradiated with light, the diselenide group is re-formed to correct the defects immediately, thereby preventing damage to the hard coating film 120.

Particularly, because the dissociation and re-formation of the diselenide group is repeated, the self-healing characteristics of the diselenide group last semi-permanently, resulting in improved durability of the hard coating film 120. Also, when the silsesquioxane moiety is introduced as the siloxane moiety, the hard coating film 120 may have sufficient hardness. Therefore, the hard coating film 120 of the present disclosure is suitable for application as the outermost layer of the display device 100.

That is, according to the present disclosure, the hard coating film 120 having excellent hardness characteristics and capable of preventing surface damage to the display device 100 due to the self-healing characteristics thereof is provided. Therefore, when the hard coating film 120 is used as the outermost layer of the display device 100, a lightweight, thin display device 100 may be manufactured without any cover glass. A thin, lightweight and slim display device 100 may be manufactured through the use of the hard coating film 120 having improved anti-scratch characteristics and hardness characteristics.

Meanwhile, the display device 100 may have a touch function. In this case, the display device 100 may include a touch panel (not shown) referred to as a touch screen panel. According to one exemplary embodiment, the touch panel (not shown) may be an on-cell type in which the touch panel is disposed between the display panel 110 and the hard coating film 120. According to another exemplary embodiment, the touch panel (not shown) may be an in-cell type in which the touch panel is disposed at the other side of the display panel 110 opposite to the hard coating film 120, for example, disposed inside the display panel 110.

Figure 4:
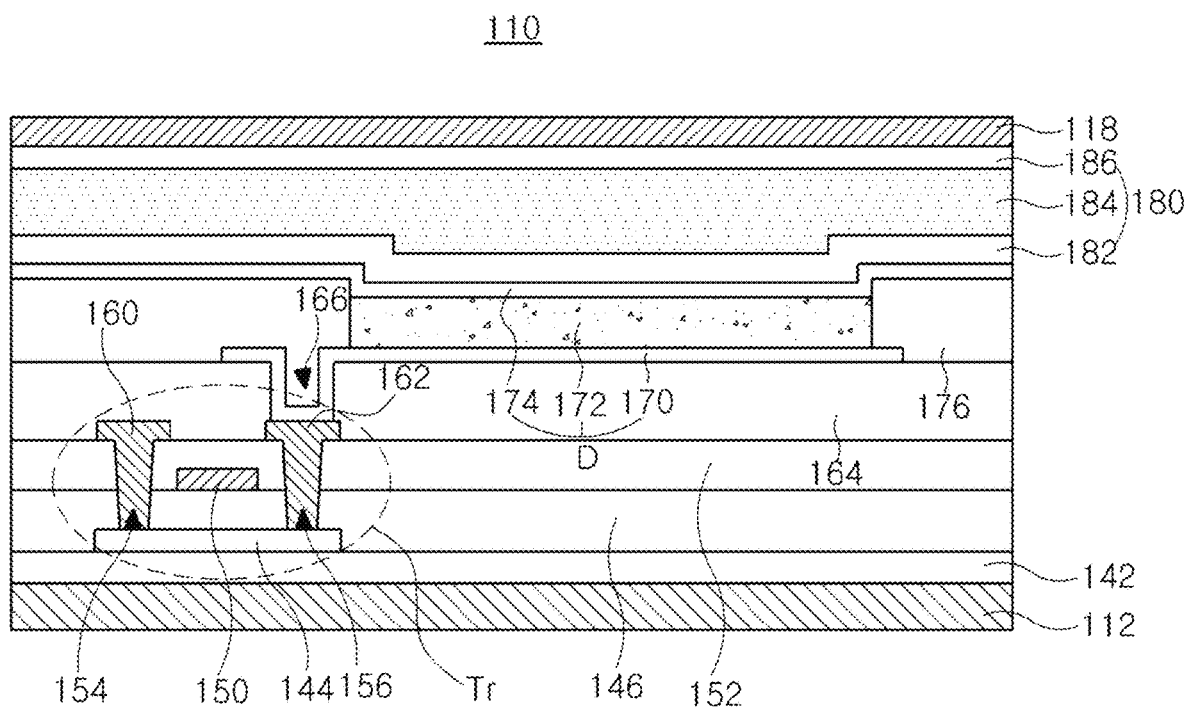
FIG. 4 is a cross-sectional view schematically showing an organic light-emitting display panel as a display panel to which the hard coating film according to one exemplary embodiment of the present disclosure is laminated.
Figure 5:
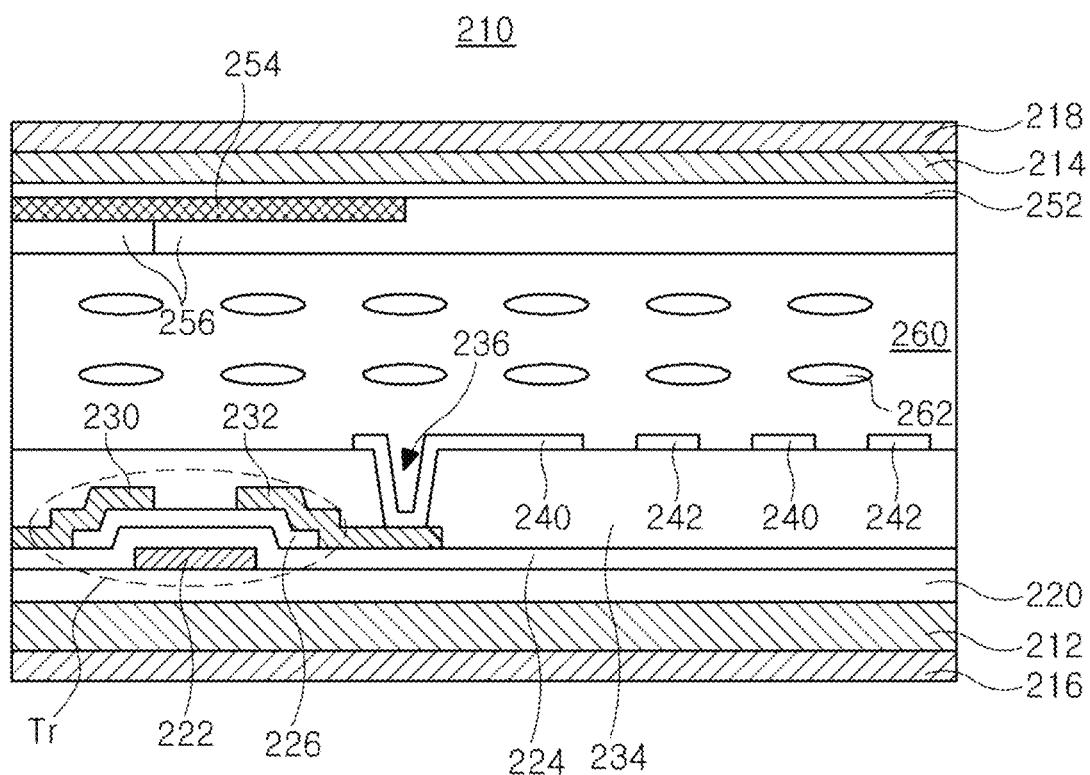
FIG. 5 is a cross-sectional view schematically showing a liquid crystal panel as the display panel to which the hard coating film according to one exemplary embodiment of the present disclosure is laminated.

FIGS. 4 and 5 are cross-sectional views schematically showing exemplary display panels, respectively. As shown in FIG. 4, the display panel 110 may be a light emitting diode display panel. That is, the display panel 110 may include a substrate 112, a thin-film transistor Tr serving as a driving element disposed on the substrate 112, a light emitting diode D disposed on the substrate 112 and connected to the thin-film transistor Tr, and an encapsulation film 180 configured to cover the light emitting diode D.

The substrate 112 may be a glass substrate, a thin flexible substrate, or a polymer plastic substrate. For example, the flexible substrate may be formed of one selected from polyethersulfone (PES), polyethylenenaphthalate (PEN), polyimide (PI), polyethylene terephthalate (PET), and polycarbonate (PC).

Because the substrate 112 is not suitable for a process of forming a component such as the thin-film transistor Tr, the process of forming a component such as the thin-film transistor Tr is performed in a state in which the substrate 112 is attached to a carrier substrate (not shown) such as a glass substrate. Thereafter, the display panel 110 may be obtained by separating the substrate 112 from the carrier substrate.

A buffer layer 142 is formed on the substrate 112, and a thin-film transistor Tr serving as a driving element is formed on the buffer layer 142. The buffer layer 142 may be formed of an inorganic insulating material such as silicon oxide or silicon nitride. The buffer layer 142 may be omitted.

A semiconductor layer 144 is formed on the buffer layer 142. The semiconductor layer 144 may be formed of an oxide semiconductor material, or formed of polycrystalline silicon. When the semiconductor layer 144 is formed of the oxide semiconductor material, a light-shielding pattern (not shown) may be formed under the semiconductor layer 144, and the light-shielding pattern prevent light from being incident on the semiconductor layer 144, thereby preventing the semiconductor layer 144 from being degraded by light. On the other hand, the semiconductor layer 144 may be formed of the polycrystalline silicon. In this case, both edges of the semiconductor layer 144 may be doped with impurities.

A gate insulating film 146 formed of an insulating material is formed on the semiconductor layer 144. The gate insulating film 146 may be formed of an inorganic insulating material such as silicon oxide or silicon nitride. A gate electrode 150 formed of a conductive material such as a metal is formed on the gate insulating film 146 to correspond to the center of the semiconductor layer 144. In FIG. 4, the gate insulating film 146 is formed on the entire surface of the substrate 112. However, the gate insulating film 146 may be patterned to have the same shape as the gate electrode 150.

An interlayer insulating film 152 formed of an insulating material is formed on the gate electrode 150. The interlayer insulating film 152 may be formed of an inorganic insulating material such as silicon oxide or silicon nitride, or formed of an organic insulating material such as benzocyclobutene or photo-acryl.

The interlayer insulating film 152 includes first and second contact holes 154 and 156 configured to expose both sides of the semiconductor layer 144. The first and second contact holes 154 and 156 are disposed at both sides of the gate electrode 150 to be spaced apart from the gate electrode 150. Here, the first and second contact holes 154 and 156 are also formed inside the gate insulating film 146. On the other hand, when the gate insulating film 146 is patterned to have the same shape as the gate electrode 150, the first and second contact holes 154 and 156 may also be formed only inside the interlayer insulating film 152.

A source electrode 160 and a drain electrode 162, both of which are formed of a conductive material such as a metal, are formed on the interlayer insulating film 152. The source electrode 160 and the drain electrode 162 are disposed spaced apart from each other with respect to the gate electrode 150, and come into contact with both sides of the semiconductor layer 144 through the first and second contact holes 154 and 156, respectively.

The semiconductor layer 144, the gate electrode 150, the source electrode 160, and the drain electrode 162 constitute the thin-film transistor Tr, and the thin-film transistor Tr serves as a driving element. In FIG. 4, the thin-film transistor Tr has a coplanar structure in which the gate electrode 150, the source electrode 160, and the drain electrode 162 are disposed on the semiconductor layer 144. On the other hand, the thin-film transistor Tr may have an inverted staggered structure in which the gate electrode is disposed under the semiconductor layer and the source and drain electrodes are disposed on the semiconductor layer. In this case, the semiconductor layer may be formed of amorphous silicon.

A gate line and a data line intersect with each other to define a pixel region, and a switching element connected to the gate line and the data line is further formed. The switching element is connected to the thin-film transistor Tr serving as the driving element. Also, a power line is formed parallel with the gate line or the data line to be spaced apart from the gate line or the data line, and a storage capacitor configured to maintain a constant voltage of the gate electrode of the thin-film transistor Tr serving as the driving element for one frame interval may be further formed.

A protective layer 164, which includes a drain contact hole 166 configured to expose the drain electrode 162 of the thin-film transistor Tr, is formed to cover the thin-film transistor Tr. A first electrode 170 connected to the drain electrode 162 of the thin-film transistor Tr through the drain contact hole 166 is formed on the protective layer 164 to be separated in each pixel region. The first electrode 170 may be an anode, and may be formed of a conductive material having a relatively high work function value. For example, the first electrode 170 may be formed of a transparent conductive material such as indium-tin-oxide (ITO) or indium-zinc-oxide (IZO).

Meanwhile, when the display panel 110 of the present disclosure is a top-emission type, a reflective electrode or a reflective layer may be further formed under the first electrode 170. For example, the reflective electrode or the reflective layer may be formed of an aluminum-palladium-copper (APC) alloy.

Also, a bank layer 176 configured to cover an edge of the first electrode 170 is formed on the protective layer 164. The bank layer 176 corresponds to the pixel region to expose the center of the first electrode 170.

An organic emissive layer 172 is formed on the first electrode 170. The organic emissive layer 172 may have a single-layered structure of an emitting material layer formed of a light emitting material. To improve light emitting efficiency, the organic emissive layer 172 may also have a multi-layered structure in which a hole injection layer, a hole transporting layer, an light emitting material layer, an electron transporting layer, and an electron injection layer are sequentially stacked on the first electrode 170.

A second electrode 174 is formed above the substrate 140 on which the organic emissive layer 172 is formed. The second electrode 174 is disposed on the entire surface of a display area, and may be used as a cathode formed of a conductive material having a relatively low work function value. For example, the second electrode 174 may be formed of any one selected from aluminum (Al), magnesium (Mg), and an aluminum-magnesium alloy (AlMg). The first electrode 170, the organic emissive layer 172, and the second electrode 174 constitute a light emitting diode D.

An encapsulation film 180 is formed on the second electrode 174 to prevent moisture outside the encapsulation film 180 from penetrating into the light emitting diode D. The encapsulation film 180 may have a stacked structure of a first inorganic insulation layer 182, an organic insulation layer 184, and a second inorganic insulation layer 186, but the present disclosure is not limited thereto.

Also, a polarizing plate 118 may be attached onto the encapsulation film 180 to reduce reflection of ambient light. For example, the polarizing plate 118 may be a circular polarizing plate. However, when there is no problem regarding a decline in contrast ratio by ambient light, the polarizing plate 118 may be omitted. In this case, the polarizing plate 118 may be coated with the hard coating film 120 (see FIG. 3), or the hard coating film 120 may be attached onto the polarizing plate 118 in the form of a separate film.

Meanwhile, as shown in FIG. 5, a liquid crystal panel 210 may be used as the display panel 110. The liquid crystal panel 210 includes facing first and second substrates 212 and 214, and a liquid crystal layer 260 interposed between the first and second substrates 212 and 214 and including liquid crystal molecules 262.

A first buffer layer 220 is formed on the first substrate 212, and a thin-film transistor Tr is formed on the first buffer layer 220. The first buffer layer 220 may be omitted. A gate electrode 222 is formed on the first buffer layer 220, and a gate insulating film 224 is formed to cover the gate electrode 222. Also, a gate line (not shown) connected to the gate electrode 222 is formed on the first buffer layer 220.

A semiconductor layer 226 is formed on the gate insulating film 224 to correspond to the gate electrode 222. The semiconductor layer 226 may be formed of an oxide semiconductor material. Meanwhile, the semiconductor layer 226 may include an active layer formed of amorphous silicon and an ohmic contact layer formed of impurity-doped amorphous silicon.

A source electrode 230 and a drain electrode 232 are formed on the semiconductor layer 226 to be spaced apart from each other. Also, a data line (not shown) connected to the source electrode 230 is formed to intersect with the gate line and define a pixel region. The gate electrode 222, the semiconductor layer 226, the source electrode 230, and the drain electrode 232 constitute a thin-film transistor Tr.

A protective layer 234 having a drain contact hole 236 configured to expose the drain electrode 232 is formed on the thin-film transistor Tr. A pixel electrode 240 connected to the drain electrode 232 through the drain contact hole 236, and a common electrode 242 arranged alternately with the pixel electrode 240 are formed on the protective layer 234.

A second buffer layer 252 is formed on the second substrate 214, and a black matrix 254 configured to cover non-display areas such as the thin-film transistor Tr, the gate line, the data line, and the like is formed on the second buffer layer 252. Also, a color filter layer 256 is formed to correspond to the pixel region. The second buffer layer 252 and the black matrix 254 may be omitted.

The first and second substrates 212 and 214 are laminated with the liquid crystal layer 260 interposed therebetween, and the liquid crystal molecules 262 of the liquid crystal layer 260 are driven by an electric field generated between the pixel electrode 240 and the common electrode 242.

First and second polarizing plates 216 and 218 having transmission axes perpendicular to each other are attached to the outsides of the first and second substrates 212 and 214, respectively. Although not shown, an alignment film may also be formed on each of the first and second substrates 212 and 214 to be adjacent to the liquid crystal layer 260, and a backlight unit configured to supply light, for example, a flexible type backlight unit may be disposed under the first substrate 212. The second polarizing plate 218 may be coated with the hard coating film 120 (see FIG. 3), or the hard coating film 120 may be attached onto the second polarizing plate 218 in the form of a separate film.

The hard coating film 120 (see FIG. 3) of the present disclosure includes a binder 122 (see FIG. 3) and a silicon compound 124 (see FIG. 3) dispersed in the binder, and the silicon compound contains a diselenide group capable of realizing a self-healing mechanism and siloxane moieties linked to both sides of the diselenide group. Even when stress is applied to the hard coating film 120 (see FIG. 3), which includes the silicon compound 124 (see FIG. 3) containing the diselenide group, to dissociate the diselenide group and cause temporary defects, the diselenide group may be re-formed by light with low radiant intensity to correct the defects quickly. Therefore, the physical properties (i.e., anti-scratch characteristics) of the hard coating film 120 may be improved. Also, when silsesquioxane moieties are applied as the siloxane moieties linked via the diselenide group, structural stability and hardness of the silicon compound 124 (see FIG. 3) are improved, and hardness characteristics of the hard coating film 120 (see FIG. 3) including the silicon compound are also improved. Accordingly, because the cover glass need not be used in the display device, a thin and lightweight display device may be manufactured.

[Prism Sheet, Backlight Unit and Liquid Crystal Display Device]

Figure 6:
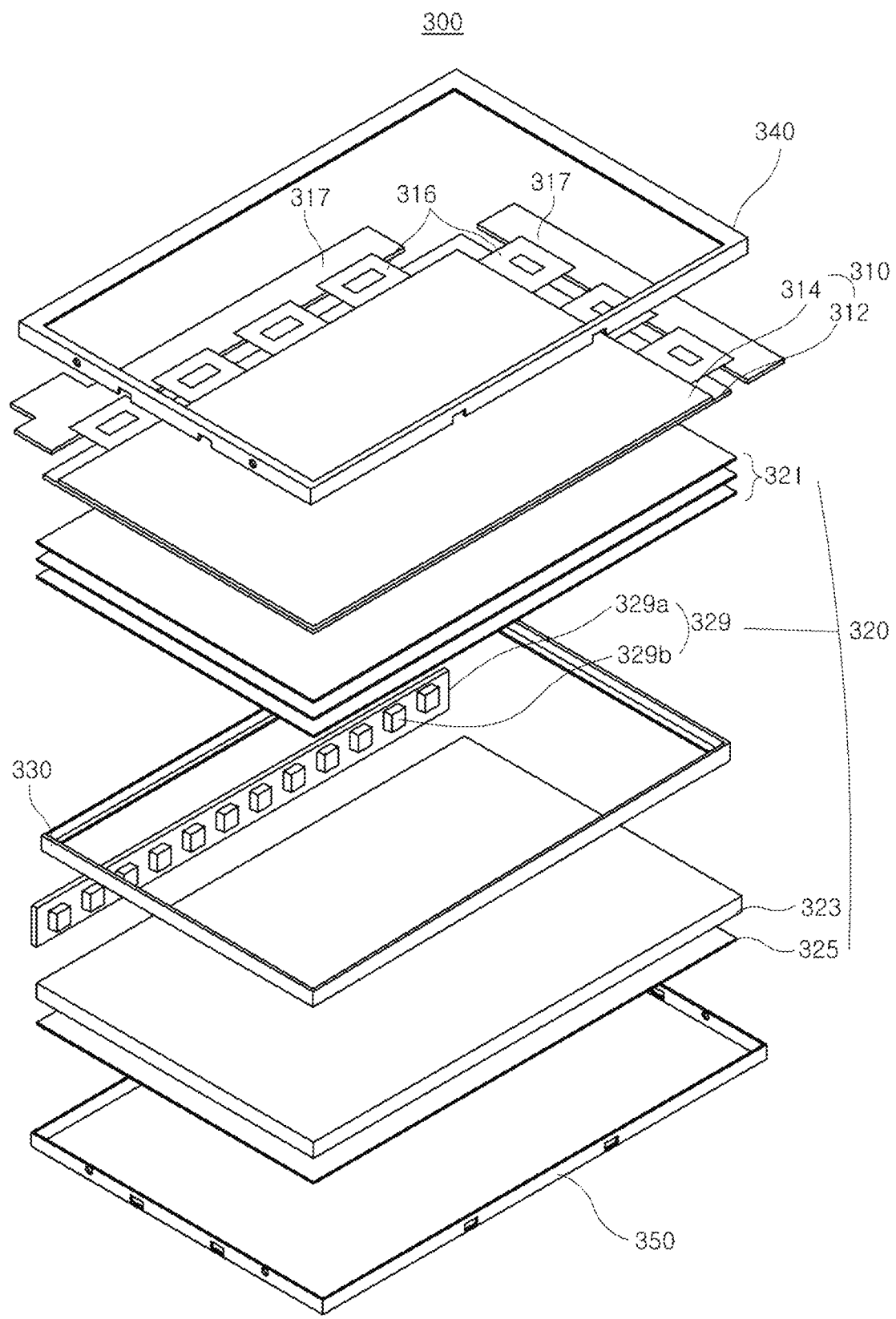
FIG. 6 is an exploded perspective view showing a coupling relationship between members constituting a liquid crystal display device which includes a prism sheet including the silicon compound according to one exemplary embodiment of the present disclosure.

According to a second exemplary embodiment of the present disclosure, the silicon compound having adjacent siloxane moieties linked via a diselenide group is applied to a prism sheet. FIG. 6 is an exploded perspective view showing a coupling relationship between members constituting a liquid crystal display device in which the silicon compound according to one exemplary embodiment of the present disclosure is applicable to the prism sheet.

As shown in FIG. 6, a liquid crystal display device 300 includes a liquid crystal panel 310 and a backlight unit 320, and the backlight unit 320 includes a prism sheet (not shown). Also, the liquid crystal display device 300 may further include a main frame 330, a top frame 340, and a bottom frame 350.

The liquid crystal panel 310 is a unit configured to play a critical role in displaying images, and includes a first substrate 312 and a second substrate 314, both of which are laminated to face each other with a liquid crystal layer (not shown) disposed therebetween. The liquid crystal panel 310 may have substantially the same structure as the liquid crystal panel 210 shown in FIG. 5, and thus a detailed description thereof is omitted.

Gate and data printed circuit boards 317 are coupled along at least one edge of the liquid crystal panel 310 by means of a coupling member 316 such as a flexible printed circuit board so that the gate and data printed circuit boards 317 are closely adhered to the main frame 330 during a modularization process. Also, a seal pattern (not shown) is formed along edges of the first substrate 312 and the second substrate 314 to prevent leakage of the liquid crystal layer.

The backlight unit 320 is disposed below the liquid crystal panel 310 to supply light. In this case, the liquid crystal display device is allowed to realize images by expressing a difference in transmittance caused when the liquid crystal molecules of the liquid crystal layer are driven as described above. The backlight unit 320 includes a light guide plate 323, a reflective plate 325, an optical sheet 321, and a light source 329.

The light guide plate 323 is disposed below the liquid crystal panel 310, and the reflective plate 325 is disposed at a rear surface of the light guide plate 323. That is, the light guide plate 323 is disposed between the liquid crystal panel 310 and the reflective plate 325. Also, the optical sheet 321 is disposed above the light guide plate 323, that is, disposed between the liquid crystal panel 310 and the light guide plate 323.

The light source 329 may be a light emitting diode (LED; hereinafter referred to as 'LED') assembly. In this case, the light source 329 may be an LED assembly. As the LED assembly, the light source 329 includes an LED printed circuit board 329a disposed parallel with the light guide plate 323, and a plurality of LEDs 329b mounted on the LED printed circuit board 329a and configured to emit light through a lateral surface of the LED printed circuit board 329a. Optionally, either a cold cathode fluorescent lamp (CCFL) or an external electrode fluorescent lamp may also be used as the light source 329.

The light source 329 is disposed at one side of the light guide plate 323 to supply light toward the light guide plate 323. That is, light emitted from the light source 329 is incident on the light guide plate 323, and then uniformly scattered into the light guide plate 323 via total reflection. In this case, the scattered light passed through the optical sheet 321 becomes a uniform surface light source to be supplied to the liquid crystal panel 310.

The light guide plate 323 may include a pattern (not shown) with a certain shape formed at a rear surface thereof in order to supply a uniform surface light source. For example, the pattern may be an elliptical, polygonal, or hologram pattern.

The reflective plate 325 reflects light on the rear surface of the light guide plate 323 to improve light efficiency. As will be described below, the optical sheet 321 may include a prism sheet, and may further include at least one diffusing sheet.

The main frame 330 is configured to surround lateral surfaces of the liquid crystal panel 310 and the backlight unit 320, and the bottom frame 350 is configured to cover a rear surface of the backlight unit 320. Also, the top frame 340 is configured to cover a front edge of the liquid crystal panel 310, and combined with the main frame 330 and the bottom frame 350 to constitute the liquid crystal display device 300.

Meanwhile, an edge-type backlight unit which includes the light guide plate 323 and the light source 329 disposed at one side of the light guide plate 323 has been described with reference to FIG. 6. On the other hand, the light source may be a direct-type backlight unit in which a plurality of light sources are arranged under an optical sheet 321 without any light guide plate 323 to directly irradiate the optical sheet 321 with light.

Figure 7A:
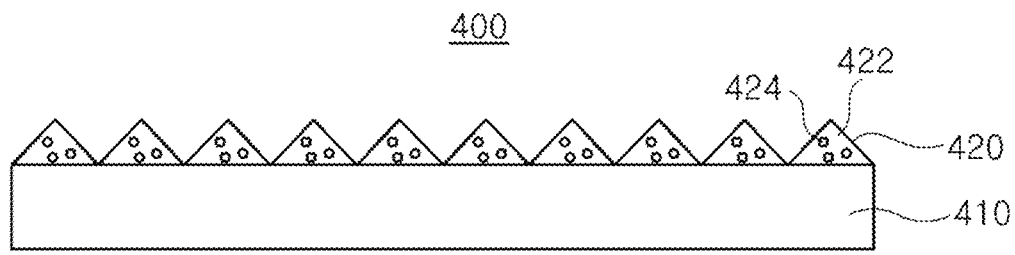
FIG. 7A is a cross-sectional view schematically showing a prism sheet to which the silicon compound according to one exemplary embodiment of the present disclosure is applied.
Figure 7B:
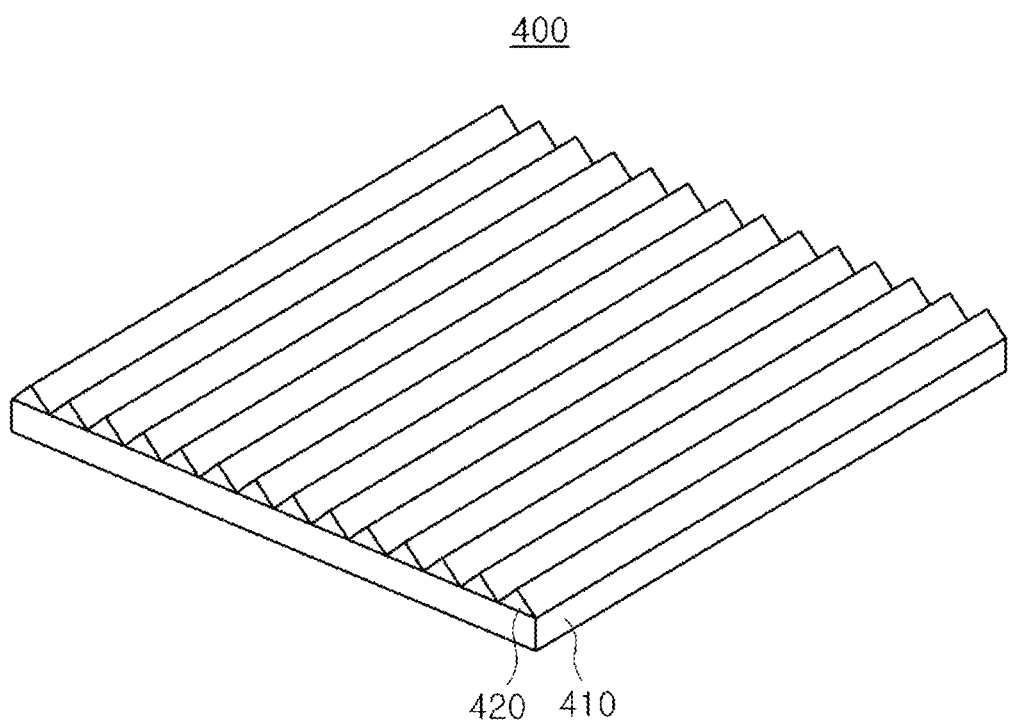
FIG. 7B is a perspective view schematically showing a prism sheet to which the silicon compound according to one exemplary embodiment of the present disclosure is applied.

That is, the present disclosure relates to a backlight unit 320 in which the light source 329 may be disposed under the optical sheet 321 including the prism sheet to supply light from the light source 329 to the liquid crystal panel 310 via the prism sheet, and a liquid crystal display device 300, and a prism sheet used in the backlight unit 320 and liquid crystal display device 300. Among these, the prism sheet to which the silicon compound according to the present disclosure is applied will be described in further detail. FIGS. 7A and 7B are a cross-sectional view and a perspective view, respectively, schematically showing a prism sheet according to the present disclosure.

As shown in FIGS. 7A and 7B, a prism sheet 400 of the present disclosure includes a base film 410 and a plurality of prism patterns 420 arranged on one surface of the base film 410. The plurality of prism patterns 420 may be arranged in the same direction.

The base film 410 may be formed of a material having a refractive index of approximately 1.5 to 1.6. For example, the base film 410 may be formed of polyethylene terephthalate (PET) or polycarbonate (PC).

The prism patterns 420 includes a binder 422, and a silicon compound 424 dispersed in the binder and containing a diselenide group (—Se—Se—) and siloxane moieties linked to both sides of the diselenide group. For example, the siloxane moieties may be silsesquioxane moieties. In a conventional prism sheet, light uniformity may be degraded due to easy damage to a prism pattern, or transmittance may be deteriorated by the prism pattern, resulting in degraded brightness of the liquid crystal display device 300. However, according to the present disclosure, prism patterns 420 have an advantage in that defects caused in the prism patterns 420 may be rapidly corrected through a self-healing mechanism using the diselenide group, and strength of the prism patterns 420 may also be improved because the prism patterns 420 include a siloxane moiety having excellent hardness such as the silsesquioxane.

Meanwhile, like the binder used in the hard coating film 20 (see FIG. 1), the binder 422 included in the prism patterns 420 may be a photoreactive compound, for example, may be a (meth)acrylate-based compound. For example, the binder 422 includes binders cured by UV rays. For example, the binder 422 may be any one selected from polyester(meth)acrylate, epoxy(meth)acrylate, urethane(meth)acrylate, and siloxane-modified (meth)acrylate.

Like the use of the liquid composition for forming hard coatings, which includes the binder precursor (i.e., a monomer/oligomer), the solvent, the photopolymerization initiator, and the silicon compound, to form the hard coating film 20 (see FIG. 1), the liquid composition for forming hard coatings may be used to form the prism patterns 420. The types and contents of the monomer/oligomer, the solvent, the photopolymerization initiator, and the silicon compound included in the liquid composition for forming a prism pattern are substantially the same as in the liquid composition for forming hard coatings.

When stress is applied to the prism sheet 400 of the present disclosure, a diselenide group constituting the silicon compound 424 temporarily dissociates so that temporary defects occur in the prism sheet 400. However, when the diselenide group which has been dissociated by the stress is irradiated with light, the diselenide group is re-formed to correct the defects immediately, thereby preventing damage to the prism sheet 400. Particularly, because dissociation and re-formation of the diselenide group are repeated, self-healing characteristics of the diselenide group last semi-permanently, resulting in improved durability of the prism sheet 400. Also, when silsesquioxane moieties are applied as the siloxane moieties linked via the diselenide group, rigidity or hardness of the prism patterns 420 and the prism sheet 400 including the same may be improved.

That is, damage to the prism patterns 420 may be rapidly corrected by the diselenide group included in the silicon compound 424 of the present disclosure, and a silsesquioxane moiety having excellent hardness characteristics may be used to improve rigidity of the prism patterns 420, thereby preventing damage to the prism patterns 420. The damage to the prism patterns 420 may be rapidly corrected due to the self-healing characteristics of the diselenide group, thereby solving problems regarding degraded light uniformity.

Hereinafter, the present disclosure will be described in further detail with reference to exemplary embodiments thereof. However, it should be understood that the following detailed description disclosed herein is given for the purpose of illustration only and is not intended to limit or define the scope of the present disclosure.

Synthesis Example 1: Synthesis of Silsesquioxane Selenol

Silsesquioxane selenol in which silicon atoms constituting a silsesquioxane were directly bound to a selenol was synthesized, as follows. 20 mL of hydrochloric acid was added to a mixture including 10 mL of 3-trimethoxysilane-1-selenol and 240 mL of methanol as starting precursors. The reaction mixture was put into a 500 mL round-bottom flask, and stirred at 90° C. for 3 hours. A white viscous precipitate settled on a bottom of the flask was washed three times with methanol to remove a residual reactant. The precipitate was dissolved in 3 mL of THF, and the dissolved precipitate solution was added dropwise to 200 mL of acetonitrile. The mixture was re-crystallized overnight at −20° C. As the resulting product, a silsesquioxane intermediate product having a cage structure, into which a selenol was introduced, was washed with acetone, and then dried at room temperature for 12 hours in a vacuum pump to separate a silsesquioxane selenol having a cage structure, for future use. The silsesquioxane selenol having a random structure, which was not separated in a crystal phase, was also stored for future use.

Synthesis Example 2: Synthesis of Silsesquioxane Selenol

The same procedure as in Synthesis Example 1 was repeated, except that 3-trimethoxy silane methane-1-selenol was used as the starting precursor instead of the 3-trimethoxysilane-1-selenol. A silsesquioxane selenol having random and cage structures, in which a methylene group was linked between a selenol and silicon atoms constituting a silsesquioxane, was synthesized.

Synthesis Example 3: Synthesis of Silsesquioxane Selenol

The same procedure as in Synthesis Example 1 was repeated, except that 3-trimethoxy silane methane-1-selenol was used as the starting precursor instead of the 3-trimethoxysilane-1-selenol, and 1,4-dichlorophenylenediamine was added as a coupler. A silsesquioxane selenol having a ladder structure, in which a methylene group was linked between a selenol and silicon atoms constituting a silsesquioxane, was synthesized.

Synthesis Example 4: Synthesis of Silsesquioxane Selenol

The same procedure as in Synthesis Example 1 was repeated, except that 3-trimethoxy silane ethane-1-selenol was used as the starting precursor instead of the 3-trimethoxysilane-1-selenol. A silsesquioxane selenol having random and cage structures, in which an ethylene group was linked between a selenol and silicon atoms constituting a silsesquioxane, was synthesized.

Synthesis Example 5: Synthesis of Silicon Compound Containing Silsesquioxane Moiety with Random-Random Structure The silsesquioxane selenol synthesized in Synthesis Example 1, which had a random structure in which the silicon atoms were directly linked to the selenol, was thermally treated at 80° C. to synthesize a silicon compound in which silsesquioxane moieties having a random structure were linked to both sides of a diselenide group, respectively.

Synthesis Example 6: Synthesis of Silicon Compound Containing Silsesquioxane Moiety with Random-Cage Structure A mixture of the silsesquioxane selenol having a random structure in which the silicon atoms were directly linked to the selenol and the silsesquioxane selenol having a cage structure in which the silicon atoms were directly linked to the selenol, as synthesized in Synthesis Example 1, was thermally treated at 80° C. to synthesize a silicon compound in which each of a silsesquioxane moiety having a random structure and a silsesquioxane moiety having a cage structure was linked to a diselenide group.

Synthesis Example 7: Synthesis of Silicon Compound Containing Silsesquioxane Moiety with Cage-Care Structure The silsesquioxane selenol synthesized in Synthesis Example 1, which had a cage structure in which the silicon atoms were directly linked to the selenol, was thermally treated at 80° C. to synthesize a silicon compound in which silsesquioxane moieties having a cage structure were linked to both sides of a diselenide group, respectively.

Synthesis Example 8: Synthesis of Silicon Compound Containing Silsesquioxane Moiety with Random-Random Structure The silsesquioxane selenol synthesized in Synthesis Example 2, which had a random structure in which the methylene group was linked between the selenol and the silicon atoms, was thermally treated at 80° C. to synthesize a silicon compound in which silsesquioxane moieties having a random structure were linked to both sides of a diselenide group.

Synthesis Example 9: Synthesis of Silicon Compound Containing Silsesquioxane Moiety with Random-Ladder Structure The silsesquioxane selenol synthesized in Synthesis Example 2, which had a random structure in which the methylene group was linked between the selenol and the silicon atoms, and the silsesquioxane selenol synthesized in Synthesis Example 3, which had a ladder structure in which the methylene group was linked between the selenol and the silicon atoms, were thermally treated at 80° C. to synthesize a silicon compound in which each of a silsesquioxane moiety having a random structure and a silsesquioxane moiety having a ladder structure was linked to a diselenide group.

Synthesis Example 10: Synthesis of Silicon Compound Containing Silsesquioxane Moiety with Ladder-Ladder Structure The silsesquioxane selenol synthesized in Synthesis Example 3, which had a ladder structure in which the methylene group was linked between the selenol and the silicon atoms, was thermally treated at 80° C. to synthesize a silicon compound in which silsesquioxane moieties having a ladder structure were linked to both sides of a diselenide group.

Synthesis Example 11: Synthesis of Silicon Compound Containing Silsesquioxane Moiety with Ladder-Cage Structure The silsesquioxane selenol synthesized in Synthesis Example 2, which had a cage structure in which the methylene group was linked between the selenol and the silicon atoms, and the silsesquioxane selenol synthesized in Synthesis Example 3, which had a ladder structure in which the methylene group was linked between the selenol and the silicon atoms, were thermally treated at 80° C. to synthesize a silicon compound in which each of a silsesquioxane moiety having a cage structure and a silsesquioxane moiety having a ladder structure was linked to a diselenide group.

Synthesis Example 12: Synthesis of Silicon Compound Containing Silsesquioxane Moiety with Random-Cage Structure The silsesquioxane selenol having a random structure in which the methylene group was linked between the selenol and the silicon atoms, and the silsesquioxane selenol having a cage structure in which the methylene group was linked between the selenol and the silicon atoms, as synthesized in Synthesis Example 2, were thermally treated at 80° C. to synthesize a silicon compound in which each of a silsesquioxane moiety having a random structure and a silsesquioxane moiety having a cage structure was linked to a diselenide group.

Synthesis Example 13: Synthesis of Silicon Compound Containing Silsesquioxane Moiety with Random-Case Structure The silsesquioxane selenol having a random structure in which the ethylene group was linked between the selenol and the silicon atoms, and the silsesquioxane selenol having a cage structure in which the ethylene group was linked between the selenol and the silicon atoms, as synthesized in Synthesis Example 4, were thermally treated at 80° C. to synthesize a silicon compound in which each of a silsesquioxane moiety having a random structure and a silsesquioxane moiety having a cage structure was linked to a diselenide group.

Synthesis Example 14: Synthesis of Silicon Compound Containing Silsesquioxane Moiety with Cage-Cage Structure The silsesquioxane selenol synthesized in Synthesis Example 2, which had a cage structure in which the methylene group was linked between the selenol and the silicon atoms, was thermally treated at 80° C. to synthesize a silicon compound in which silsesquioxane moieties having a cage structure was linked to both sides of a diselenide group.

Experimental Example 1: Determination of Diselenide Bond

Figure 8:
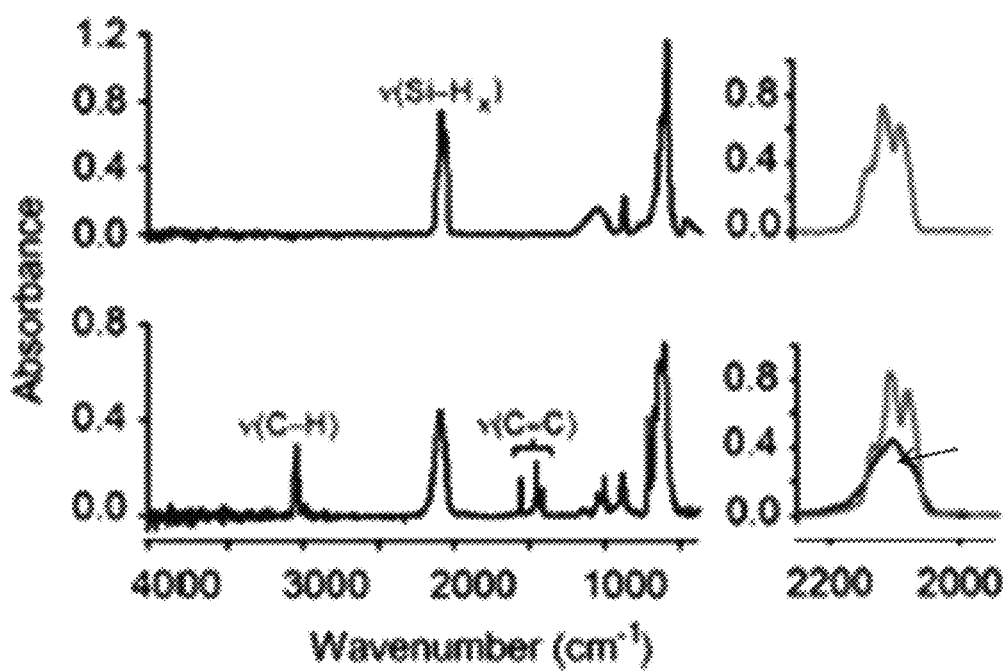
FIG. 8 is a graph illustrating results of Fourier transform infrared spectroscopy (FTIR) spectrum analysis of a silsesquioxane compound (upper panel) before siloxane moieties are linked via a diselenide group and a silsesquioxane compound (lower panel) after the siloxane moieties are linked via a diselenide group according to one exemplary embodiment of the present disclosure.

An FT-IR assay was performed on the silicon compound synthesized in Synthesis Example 7 which contained a silsesquioxane moiety having a cage-cage structure. FIG. 8 shows the results of spectrum analysis in this experimental example. It was confirmed that the silicon compound in which a plurality of silsesquioxane moieties formed a cluster structure via a diselenide bond was synthesized because new peaks were observed for the silicon compound (lower panel) after the selenide was introduced into the silsesquioxane, compared to the silicon compound (upper panel) before the selenide was introduced into the silsesquioxane.

Example 1: Preparation of Hard Coating Film

A hard coating film including the silicon compound synthesized in Synthesis Example 5 was prepared. A base material was coated with a liquid composition for forming hard coatings, which included 100% by weight of pentaerythritol triacrylate, 10% by weight of Iragacure 184, 1% by weight of the silicon compound of Synthesis Example 5, and 600% by weight of a solvent MEK with respect to methane acrylate as a binder material, and dried at 80° C. for 10 minutes. Thereafter, the liquid composition was cured by irradiation with UV rays (at 350 nm for 100 seconds) to prepare a hard coating film.

Example 2: Preparation of Hard Coating Film

A hard coating film was prepared in the same manner as in Example 1, except that the silicon compound synthesized in Synthesis Example 6 was used.

Example 3: Preparation of Hard Coating Film

A hard coating film was prepared in the same manner as in Example 1, except that the silicon compound synthesized in Synthesis Example 7 was used.

Example 4: Preparation of Hard Coating Film

A hard coating film was prepared in the same manner as in Example 1, except that the silicon compound synthesized in Synthesis Example 8 was used.

Example 5: Preparation of Hard Coating Film

A hard coating film was prepared in the same manner as in Example 1, except that the silicon compound synthesized in Synthesis Example 9 was used.

Example 6: Preparation of Hard Coating Film

A hard coating film was prepared in the same manner as in Example 1, except that the silicon compound synthesized in Synthesis Example 10 was used.

Example 7: Preparation of Hard Coating Film

A hard coating film was prepared in the same manner as in Example 1, except that the silicon compound synthesized in Synthesis Example 11 was used.

Example 8: Preparation of Hard Coating Film

A hard coating film was prepared in the same manner as in Example 1, except that the silicon compound synthesized in Synthesis Example 12 was used.

Example 9: Preparation of Hard Coating Film

A hard coating film was prepared in the same manner as in Example 1, except that the silicon compound synthesized in Synthesis Example 13 was used.

Example 10: Preparation of Bard Coating Film

A hard coating film was prepared in the same manner as in Example 1, except that the silicon compound synthesized in Synthesis Example 14 was used.

Example 11: Preparation of Hard Coating Film

A hard coating film was prepared in the same manner as in Example 1, except that, instead of the silicon compound, 1% by weight of a solution in which dichloromethane was mixed with diphenyl diselenide powder in the form of single molecules at a ratio of 1:9 was added to the liquid composition for forming hard coatings.

Comparative Example 1: Preparation of Hard Coating Film

A hard coating film was prepared in the same manner as in Example 1, except that the silicon compound was not used.

Comparative Example 2: Preparation of Hard Coating Film

A hard coating film was prepared in the same manner as in Example 1, except that, instead of the silicon compound, a solution in which dichloromethane was mixed with dimethoxy disulfide powder in the form of single molecules at a ratio of 1:9 was added to the liquid composition for forming hard coatings.

Experimental Example 2: Determination of Radiant Intensity Required for Self-Healing Mechanism An intensity of light radiated to the hard coating films including diphenyl diselenide and dimethoxy disulfide added in the form of single molecules respectively in Example 11 and Comparative Example 2 was adjusted to determine a radiant intensity at which the anti-scratch characteristics of the hard coating film were improved. It was confirmed that a radiant intensity of 100 mW/cm$^2$ was required so that the anti-scratch characteristics were improved through the self-healing mechanism in the case of the hard coating film including the dimethoxy disulfide used in Comparative Example 2. On the other hand, it was confirmed that the anti-scratch characteristics were improved through the self-healing mechanism even at a radiant intensity of 1 mW/cm$^2$ in the case of the hard coating film including the diphenyl diselenide used in Example 11. Such results showed that the self-healing mechanism was realized even at low radiant intensity because selenol binding energy was lower than thiol binding energy.

Experimental Example 3: Evaluation of Anti-Scratch Characteristics

Anti-scratch (A/S) characteristics of the hard coating films prepared in Examples 1 to 11 and Comparative Examples 1 to 2 were evaluated. The anti-scratch characteristics was evaluated by determining the number of times needed for each of the hard coating films to become worn so that a scratch occurred when rubbed with 500 g of steel wool, and each of the hard coating films was irradiated at a radiant intensity of 1 mW/cm$^2$ (100 mW/cm$^2$ in the case of Comparative Example 2) to induce healing of damage caused by the stress. The results of evaluation are listed in the following Table 1.

TABLE 1

Anti-scratch test evaluation

| Examples | SSQ/SSQ | Linking group between Se and silicon | A/S (Counts) |
|---|---|---|---|
| 1 | Random/random | None | 3,000 |
| 2 | Random/cage | None | 8,000 |
| 3 | Cage/cage | None | 10,000 |
| 4 | Random/random | —$CH_2$— | 3,000 |
| 5 | Random/ladder | —$CH_2$— | 3,000 |
| 6 | Ladder/ladder | —$CH_2$— | 3,500 |
| 7 | Ladder/cage | —$CH_2$— | 5,000 |
| 8 | Random/cage | —$CH_2$— | 10,000 |
| 9 | Random/cage | —$CH_2CH_2$— | >10,000 |
| 10 | Cage/cage | —$CH_2$ | >10,000 |
| 11 | Diphenyl diselenide | | <5,000 |
| Comparative Example 1 | No silicon compound | | 1,400 |
| Comparative Example 2 | Dimethoxy disulfide | | 700 |

As can be seen from the results of Table 1, it can be seen that scratches occurred on the hard coating film (Comparative Example 1), which did not include the silicon compound according to the present disclosure, when the steel wool was rubbed 1,400 times, and scratches occurred on the hard coating film including single disulfide molecules when the steel wool was rubbed 700 times. On the other hand, it can be seen that scratches occurred on the hard coating film to which the silicon compound of the present disclosure, which had silsesquioxane moieties linked to a diselenide group, was added at a content of 1% by weight when the steel wool was rubbed 3,000 times or more, indicating that the anti-scratch characteristics were significantly improved.

It was confirmed that, when at least one of the silsesquioxane moieties linked to the diselenide group was a silsesquioxane moiety having a cage structure (Examples 2, 3, 7, 8, 9, and 10), the anti-scratch characteristics were further improved, compared to when the diselenide compound in the form of single molecules was used. Particularly, it was confirmed that the anti-scratch characteristics were significantly improved when the silsesquioxane moieties linked to the diselenide group had a random-cage or cage-cage structure.

As can be seen from the results of Examples 8 and 9, it was also confirmed that, even when the silsesquioxane moieties linked to the diselenide group had the same structure, binding characteristics between the diselenide group and the silicon atoms constituting the silsesquioxane were improved and the anti-scratch characteristics were further improved when a linking group between the diselenide group and the silsesquioxane moieties was replaced with a highly flexible linking group.

Because the silicon compound synthesized according to the present disclosure contains siloxane moieties linked by light irradiation via a diselenide group as a moiety having self-healing characteristics, the silicon compound can prevent surface damage caused by external stress, resulting in improved anti-scratch characteristics.

That is, because the diselenide group is re-formed when the diselenide group dissociates by external stress and is then irradiated with light, surface damage caused by accumulation of the external stress can be prevented. Particularly, because the dissociation and re-formation of the diselenide group are repeated, the surface damage may be semi-permanently prevented.

Also, when the siloxane moieties are silsesquioxane groups, hardness of the hard coating film or the prism sheet can also be enhanced. For example, when the hard coating film including the silicon compound according to the present disclosure is applied to a display device, the hard coating film can be applied as the outermost layer of the display device which is devoid of a cover glass to provide a lightweight and thin display device, thereby preventing damage to the display device.

Further, because the diselenide group is sufficiently protected by bulky silsesquioxane derivatives during a UV curing process, self-healing characteristics of the hard coating film and the prism sheet can be further improved.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A silicon compound having adjacent siloxane moieties linked via a diselenide group, wherein the siloxane moieties are silsesquioxane moieties.

2. A silicon compound having adjacent siloxane moieties linked via a diselenide group, wherein the silicon compound has a unit structure represented by Chemical Formula 1, $$A\text{-}(L_1)_m\text{-}Se\text{—}Se\text{-}(L_2)_n\text{-}B, \quad \text{Chemical Formula 1)}$$

wherein A and B each independently represent a siloxane moiety, L1 and L2 each independently represent a C1-C10 alkylene group, a C3-C20 cycloalkylene group, or a C5-C30 arylene group, and m and n are each independently 0 or 1, and wherein at least one of A and B is a silsesquioxane moiety having a cage structure.

3. The silicon compound of claim 2, wherein A is a silsesquioxane moiety having a random structure or a cage structure, and B is a silsesquioxane moiety having a cage structure.

4. A hard coating film comprising:
a binder; and
a silicon compound dispersed in the binder and having adjacent siloxane moieties linked via a diselenide group.

5. A display device comprising:
a display panel; and
the hard coating film according to claim 4 and disposed at one side of the display panel.

6. The display device of claim 5, further comprising a touch panel disposed between the hard coating film and the display panel or disposed at another side of the display panel.

7. A prism sheet comprising:
a base; and
a plurality of prism patterns arranged on the base and comprising a binder and a silicon compound having adjacent siloxane moieties linked via a diselenide group.

8. A backlight unit comprising:
the prism sheet defined in claim 7; and
a light source disposed at a lower portion of the prism sheet.

9. The backlight unit of claim 8, further comprising a light guide plate disposed at a lower portion of the prism sheet, wherein the light source is disposed at one side of the light guide plate.

10. A liquid crystal display device comprising:
a liquid crystal panel; and
the backlight unit according to claim 8 and disposed at one side of the liquid crystal panel,
wherein the prism sheet is disposed between the light source and the liquid crystal panel.

* * * * *